March 23, 1948.   J. J. DUGAS   2,438,157
CLUTCH MECHANISM
Filed Oct. 9, 1945          2 Sheets-Sheet 1
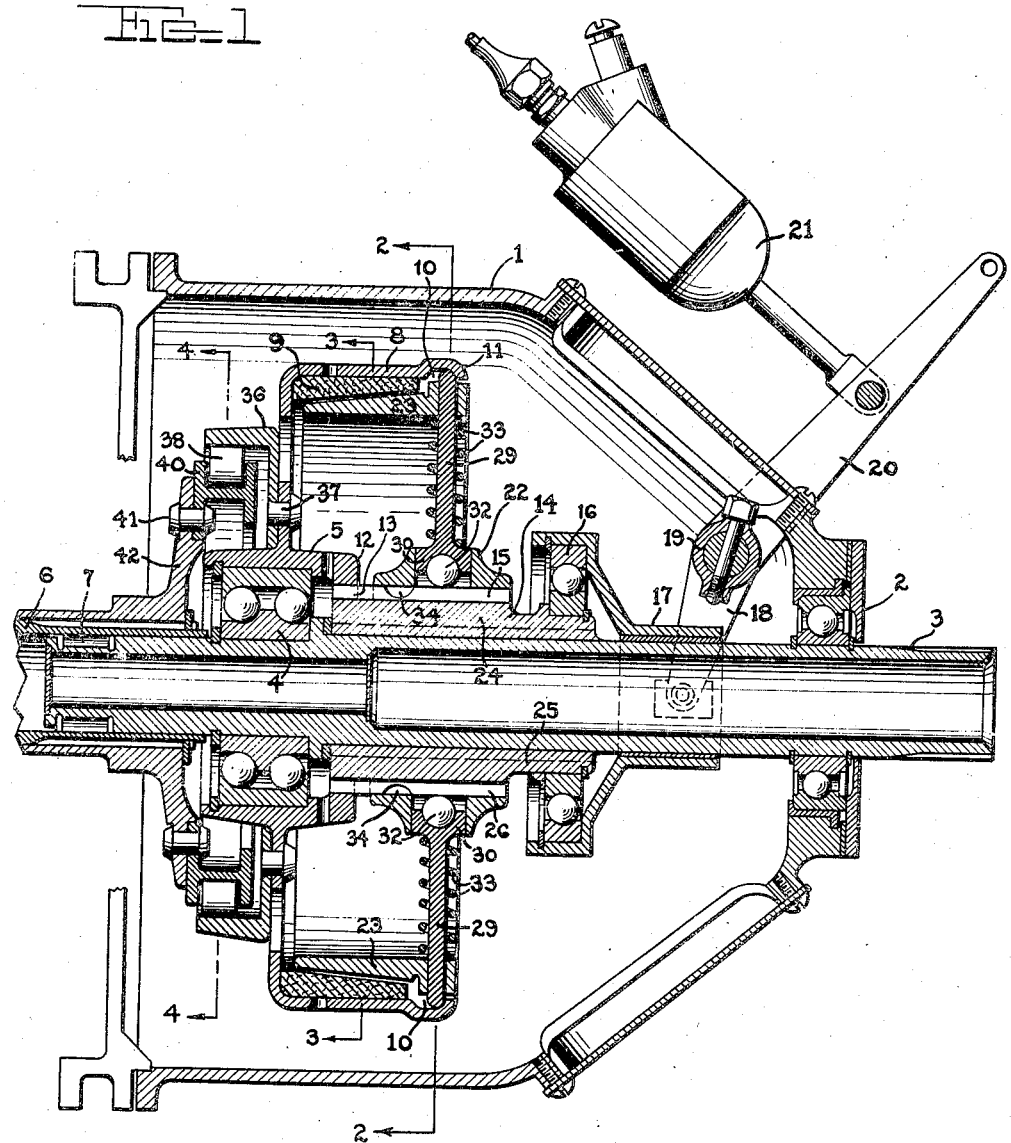
FIG. 1
FIG. 4
INVENTOR.
J. J. Dugas
BY
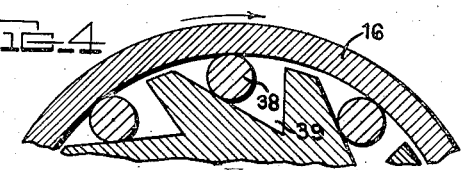
ATTORNEYS

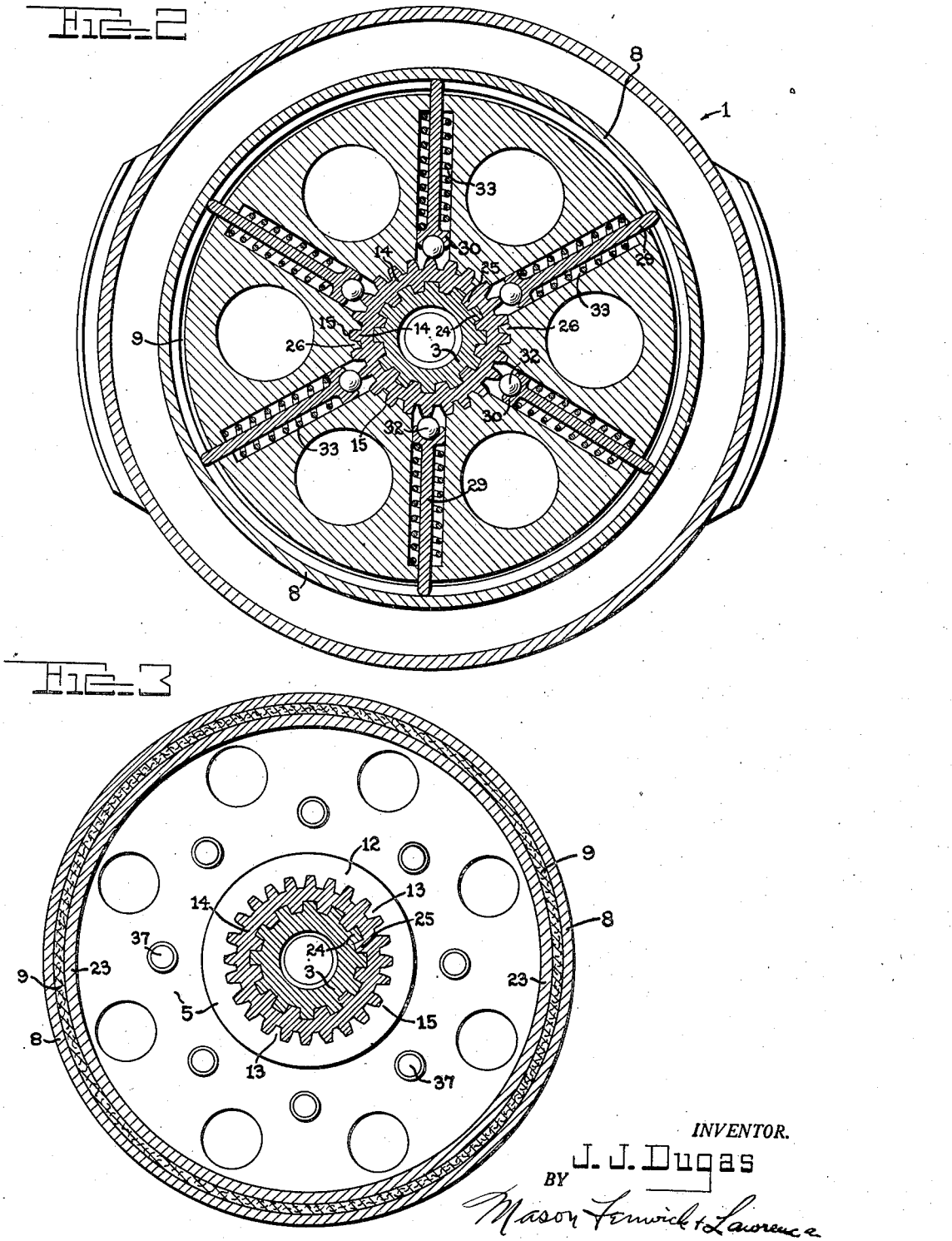

Patented Mar. 23, 1948

2,438,157

UNITED STATES PATENT OFFICE 2,438,157

CLUTCH MECHANISM

Joseph J. Dugas, New Orleans, La., assignor to Higgins Industries, Inc., New Orleans, La., a corporation of Louisiana Application October 9, 1945, Serial No. 621,245

3 Claims. (Cl. 192—53)

This invention relates to clutch mechanism, and more particularly to a clutch for connecting a prime mover such as an aircraft engine to a load in such manner that the engine operating at full speed may be gradually engaged with the load first through a frictional connection, and thereafter, when the driven member has been brought up to synchronous speed, substituting a positive mechanical engagement whereby the engine's power is delivered during full engagement by the positive mechanical connection and the friction drive completely released.

An object of the invention is the provision of a compact means for connecting and disconnecting an engine to and from a driven member capable of transmitting the full load independently through frictionally engaging members and through positive mechanically engaging members and conversely releasing the engine from the full load by a reverse release of the positive engagement members with simultaneous engagement of the frictional engagement members while the speed of the driving and driven members is the same, whereby a smooth transition is obtained without likelihood of injury to any of the parts of the clutch mechanism.

A further object of the present invention is the provision of means whereby a predetermined loading pressure must be exerted on the frictional engagement members insuring synchronous speed between driving and driven members before engagement of the positive engagement driving means.

A still further object of the invention is the provision of means whereby, when it is desired to disconnect the driving and driven members the frictional engagement members are first brought into operation so as to permit the disengagement of the mechanical connecting members substantially without load, after which the frictional engagement members may themselves be completely disconnected.

These and further objects of the invention will more fully appear in the course of the following specification.

The invention consists in the novel construction, arrangement, and combinations of parts hereinafter more particularly described and claimed.

Two sheets of drawings accompany this specification as part thereof, in which like reference characters indicate like parts throughout.

In the drawings:

Figure 1 is a vertical cross-section through the improved clutch taken on the line of the driving and driven shafts and showing the clutch mechanically or positively connecting the driving and driven members;

Figure 2 is a transverse cross-section taken on line 2—2 of Figure 1;

Figure 3 is a transverse cross-section taken on line 3—3 of Figure 1; and

Figure 4 is a fragmentary cross-section taken on line 4—4 of Figure 1.

The drawings herein illustrate a practical embodiment of the present invention as applied in connecting an aircraft engine to a helicopter propeller but the clutch is adapted to universal application in connecting prime movers such as engines to their loads.

Referring to the drawings, 1 indicates the clutch housing which is provided at one end with a bearing 2 for a driving shaft 3, which shaft 3 carries on its inner end roller bearings 7 adapted to support the end of driven shaft 6 axially aligned with the driving shaft 3.

On the driving shaft 3, ball bearing 4 is provided to rotatably support a drum clutch member 5, the drum 8 of which is provided with an inner frictional shoe 9 and has its outer edge 11 deflected to provide an inwardly opening peripheral groove 10 for a purpose hereinafter more fully explained.

The hub of the drum clutch member 5 is provided with an extension 12 formed with inwardly directed spline teeth 13.

A sleeve 14 is axially slidable upon the driving shaft 3 but nonrotatively connected thereto as by spline teeth 24 and 25 formed respectively upon the sleeve 14 and the driving shaft 3. This sleeve 14 is formed with outwardly directed spline teeth 15. The sleeve 14 carries a ballbearing 16 which engages a sleeve 17 slidable on driving shaft 3 and connected to a lever 18 pivoted to the clutch housing as at 19. The opposite end 20 of this lever is connected to an hydraulic operated device 21 for effecting the sliding of sleeve 14 upon the driving shaft 3.

A second drum clutch member 22 having a drum part 23 complementary to the frictional shoe 9 carried by drum 8 has its hub provided with inwardly directed spline teeth 26 complementary to the spline teeth 15 on the sleeve 14. The drum clutch 22 is further provided with a plurality of radially slidable pins 29 having enlarged inner ends 30 formed with inwardly directed seats for balls 32. Compression springs 33 operate to force the pins 29 inwardly with a predetermined pressure against the balls 32, which balls are arranged to ride upon the splines 15 of the sleeve 14. The splines 15 are provided with a peripheral groove or dwell 34 adapted to receive the balls 32 when the sleeve 14 is moved to bring such dwells under said balls and the pins 29 and balls 32 are so proportioned in their combined lengths as to free the outer ends of pins 29 from the peripheral groove 10 of drum clutch 5 simultaneously with the seating of balls 32 in the dwell 34.

The operation of the device from the fully engaged position illustrated in Figure 1 is as follows:

The device 21 is operated to swing lever 20, thus sliding sleeve 14 to the right, withdrawing the spline teeth 15 of sleeve 14 from their engagement with the spline teeth 13 formed on the hub 5 of the drum clutch 8. As the sleeve 14 thus moves to the right, the dwell 34 seats under the balls 32, thus permitting the compression springs 33 to force the radial fingers 29 inwardly and, at the same time, the pressure of the balls 32 against the right-hand side of the dwell 34 tends to force drum clutch 22 to the left, bringing its drum 23 into frictional engagement with the drum clutch 8. This releases the driving pressure between the spline teeth 13 and 15 and further movement of the sleeve 14 to the right permits the complete seating of the balls 32 in the dwell 34, thus completely releasing radial fingers 29 from their engagement with the peripheral groove 10 of drum clutch 8. Further movement of sleeve 14 to the right forces the dwell 34 to the right of balls 32, thus again extending radial fingers 29 and locking drum 22. Conversely, the movement of the sleeve 14 from its extreme right-hand disengaged position to the left, first operates to bring the dwell 34 under balls 32 and further movement to the left forces drum 22 to the left bringing its drum part 23 into frictional engagement with drum clutch 9, which thus begins its initial rotation. As the sleeve 14 is further advanced to the left, the dwells 34 pass out from under the balls 32 and, at the same time, the spline teeth 13 and 15 commence their engagement, the speed of the drum clutch elements 9 and 22 being at this stage of the operation the same. After the positive engagement of spline teeth 13 and 15 it will be apparent that the balls 32 having passed out of dwell 34 are free to move longitudinally of the sleeve 14, thus permitting the friction drum 23 to automatically free itself from frictional engagement with clutch drum 8 and the drive continues as a positive connection from shaft 3 to shaft 6.

In the present embodiment adapted for use in connection with a helicopter, the drum clutch 8 is connected with a conventional over-running clutch comprising the drum 36 connecting to drum 8 as by rivets 37 which is adapted to be engaged by rollers 38 positioned in V-shaped skids 39 formed on a ring 40 which is connected as by rivets 41 with a disk 42 splined to the driven shaft 6. The device is equally operative in other connections without such an overrunning clutch and the same forms no part of the present invention.

Various modifications in the precise shape and arrangement of the parts will readily suggest themselves to those skilled in the art, but within the scope of the present invention as claimed.

Having thus fully described my invention, I claim:

1. Power transmission device comprising axially aligned shafts, a drum clutch member fixedly associated with one shaft, said drum clutch formed with a hub having circumferentially arranged spline teeth, the drum portion having an inwardly open peripheral groove, a sleeve splined for axial movement only on the other shaft, said sleeve formed with outwardly directed spline teeth arranged to engage the spline teeth of the drum clutch hub, said outwardly directed spline teeth formed with a dwell groove, a second drum clutch having a hub formed with inwardly directed spline teeth adapted to slide axially on the sleeve member, and locking members carried by the second drum clutch having parts arranged to selectively engage the dwell groove in the sleeve member or the peripheral groove of the first-mentioned drum clutch.

2. The device of claim 1 in which the locking members include radially slidable pins each having on one end a ball socket and ball, spring means biasing said pins toward the sleeve, each pin of such length associated with its ball as to engage the peripheral rim of the drum clutch except when its ball end is aligned with the dwell groove of the sleeve.

3. Power transmission device comprising axially aligned shafts, complementary drum clutch members, one of said drum clutch members including circumferentially arranged spline teeth, a conical friction face and a peripheral groove, said clutch member being fixedly associated with one shaft, an operating sleeve member mounted for axial sliding movement only on the second shaft, said sleeve formed with teeth adapted to engage the spline teeth of the first drum, said teeth formed with a dwell groove, the second drum clutch formed with a hub having inwardly directed teeth and slidably mounted on the sleeve, radially slidable pins carried by the second drum clutch, balls associated with the inner ends of said pins adapted to engage the dwell groove of the sleeve, said pins and balls of a combined length to selectively engage said dwell or the peripheral groove of the first drum clutch, and means for sliding the sleeve axially with respect to the shaft and second drum clutch to successively engage the latter with the frictional cone face and the circumferentially disposed spline teeth of the first drum clutch.

JOSEPH J. DUGAS.

REFERENCES CITED

The following references are of record in the file of this patent:

UNITED STATES PATENTS

| Number | Name | Date |
|---|---|---|
| 2,068,185 | Kreis | Jan. 19, 1937 |
| 2,338,428 | Guter et al. | Jan. 4, 1944 |

FOREIGN PATENTS

| Number | Country | Date |
|---|---|---|
| 225,819 | Great Britain | Jan. 22, 1925 |